United States Patent
Stone

(10) Patent No.: US 10,533,420 B2
(45) Date of Patent: Jan. 14, 2020

(54) STRESS REDUCTION DIMPLES FOR CIRCULAR HOLES

(71) Applicant: PRATT & WHITNEY CANADA CORP., Longueuil (CA)

(72) Inventor: Paul Stone, Guelph (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 393 days.

(21) Appl. No.: 15/351,783

(22) Filed: Nov. 15, 2016

(65) Prior Publication Data

US 2018/0135415 A1    May 17, 2018

(51) Int. Cl.
*B23P 13/00*    (2006.01)
*F01D 5/02*    (2006.01)
*B64D 27/10*    (2006.01)

(52) U.S. Cl.
CPC ............... *F01D 5/02* (2013.01); *B64D 27/10* (2013.01); *F05D 2220/31* (2013.01)

(58) Field of Classification Search
CPC .......... B22F 3/1055; F23R 3/002; F01D 5/02; B64D 27/10; F05D 2260/941; F05D 2220/31; B21L 15/005
See application file for complete search history.

(56) References Cited

U.S. PATENT DOCUMENTS 3,359,815 A * 12/1967 Jeffrey .................. B21L 15/005
                                                                474/231
5,819,808 A    10/1998 Smith
6,237,344 B1    5/2001 Lee

OTHER PUBLICATIONS

Roark's Formulas for Stress and Strain, 8th Edition, Dec. 19, 2011, by Warren Young, Richard Budynas, and Ali Sadegh, McGraw-Hill Education, ISBN-10: 0071742476, chapter 6, pp. 255-305.

* cited by examiner

*Primary Examiner* — Lee A Holly
(74) *Attorney, Agent, or Firm* — Norton Rose Fulbright Canada L.L.P.

(57) ABSTRACT

A method of reducing stress concentration in a material subjected to a predominant stress in a direction parallel to an axial plane defined through an axis of a circular cylindrical hole in the material between a first material surface and a second material surface, the material having a material thickness defined between the first material surface and the second material surface, the method comprising: forming a first proximal recess in the first material surface on the axial plane having a depth less than the material thickness, the first proximal recess having an outer edge spaced a first proximal dimension in the axial plane from a first rim of the hole; and forming a second proximal recess in the second material surface on the axial plane having a depth less than the material thickness, the second proximal recess having an outer edge spaced a second proximal dimension in the axial plane from a second rim of the hole, wherein the first proximal dimension on the first material surface is diametrically opposite, relative to the hole, to the second proximal dimension on the second material surface.

15 Claims, 7 Drawing Sheets

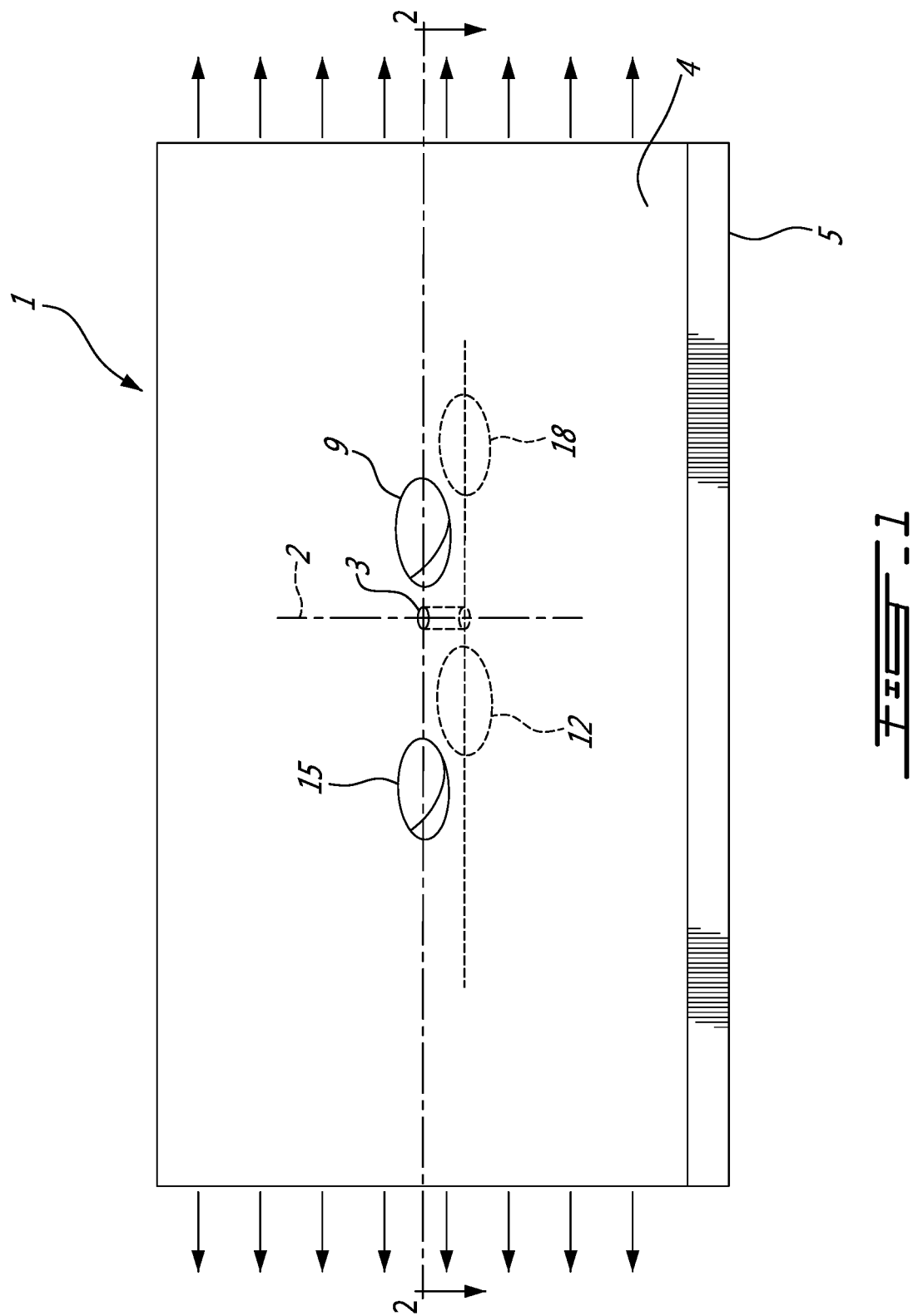

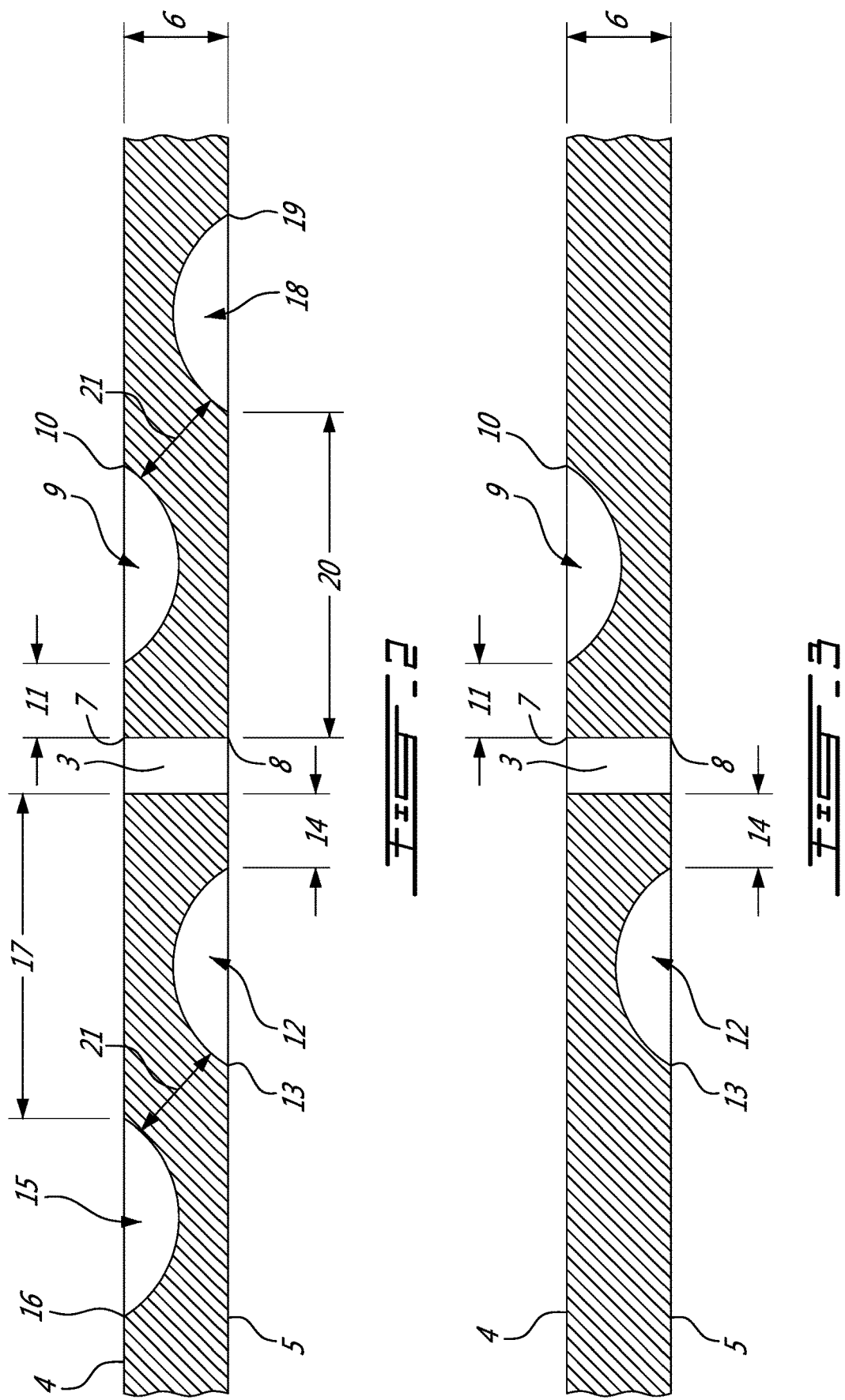

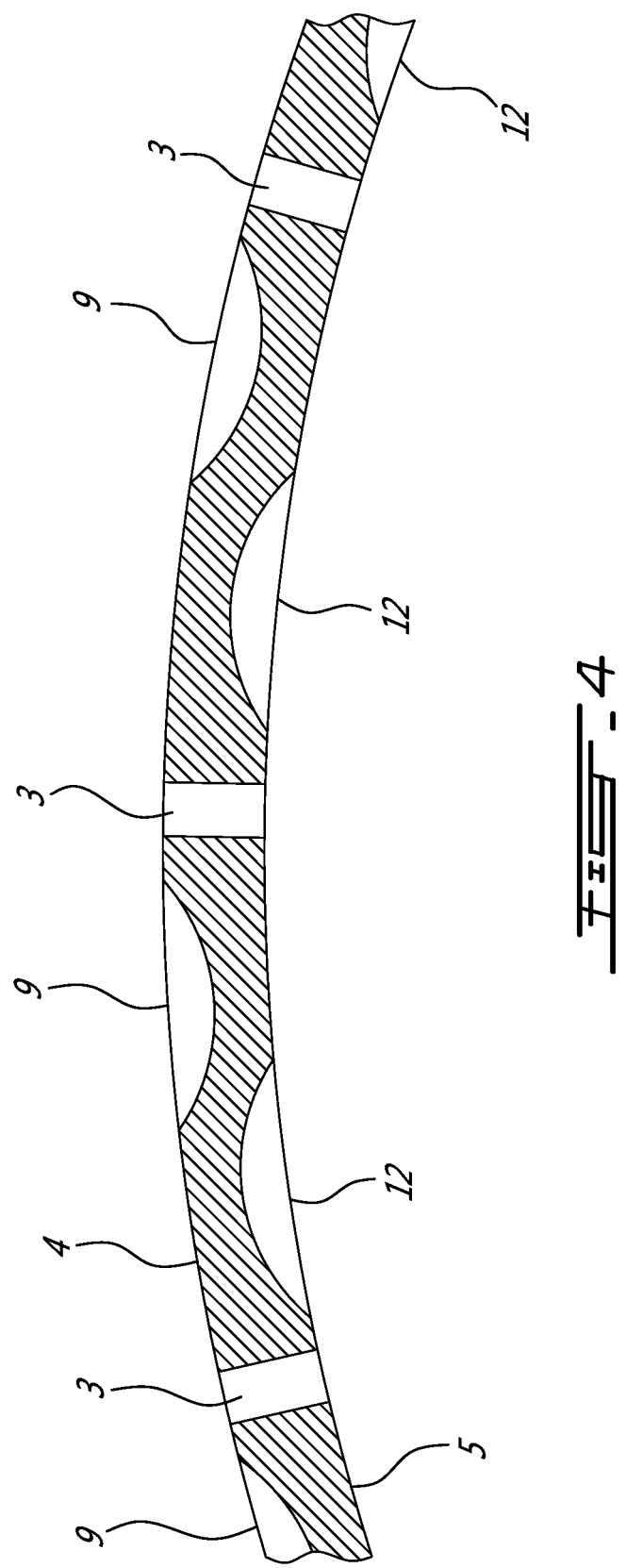

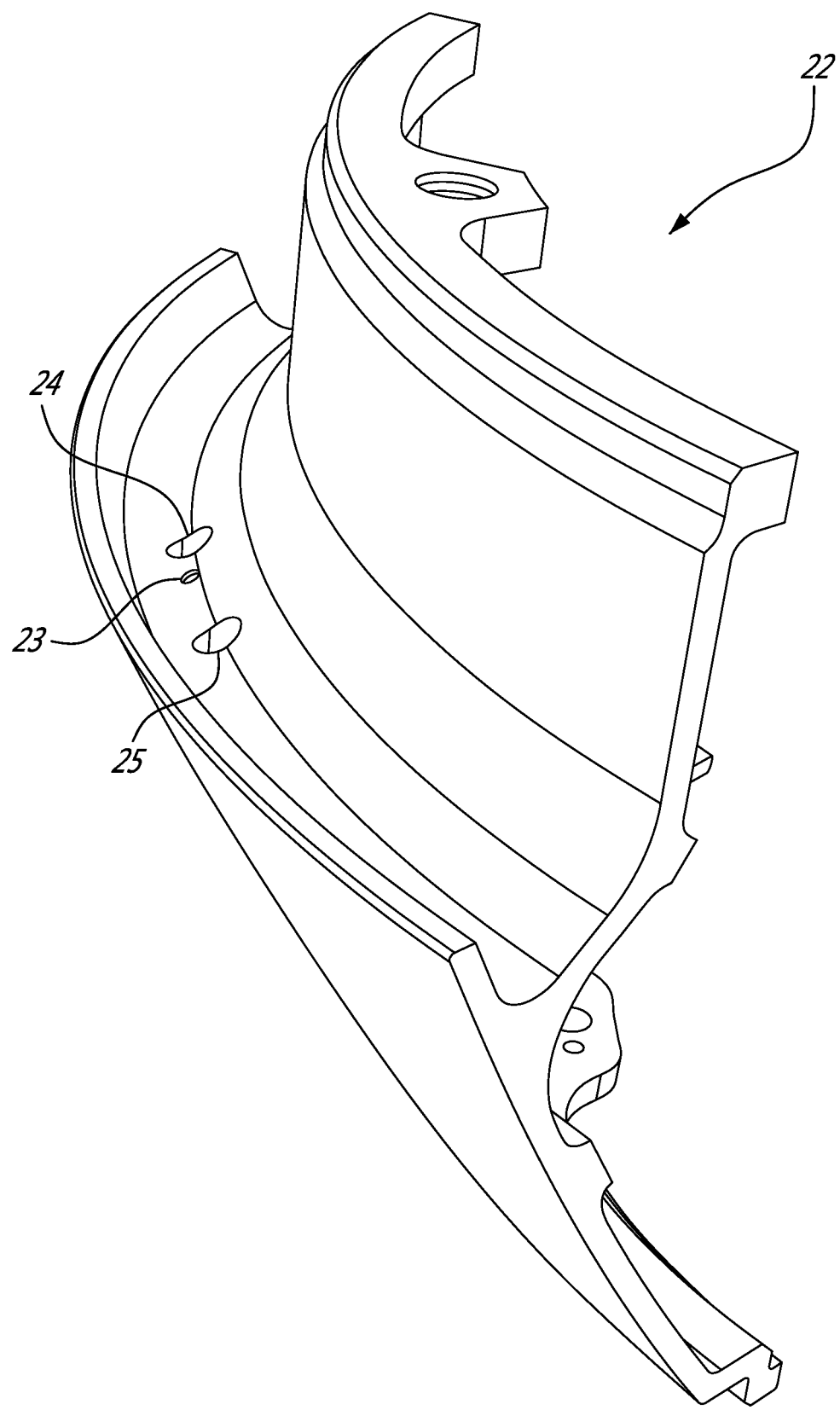

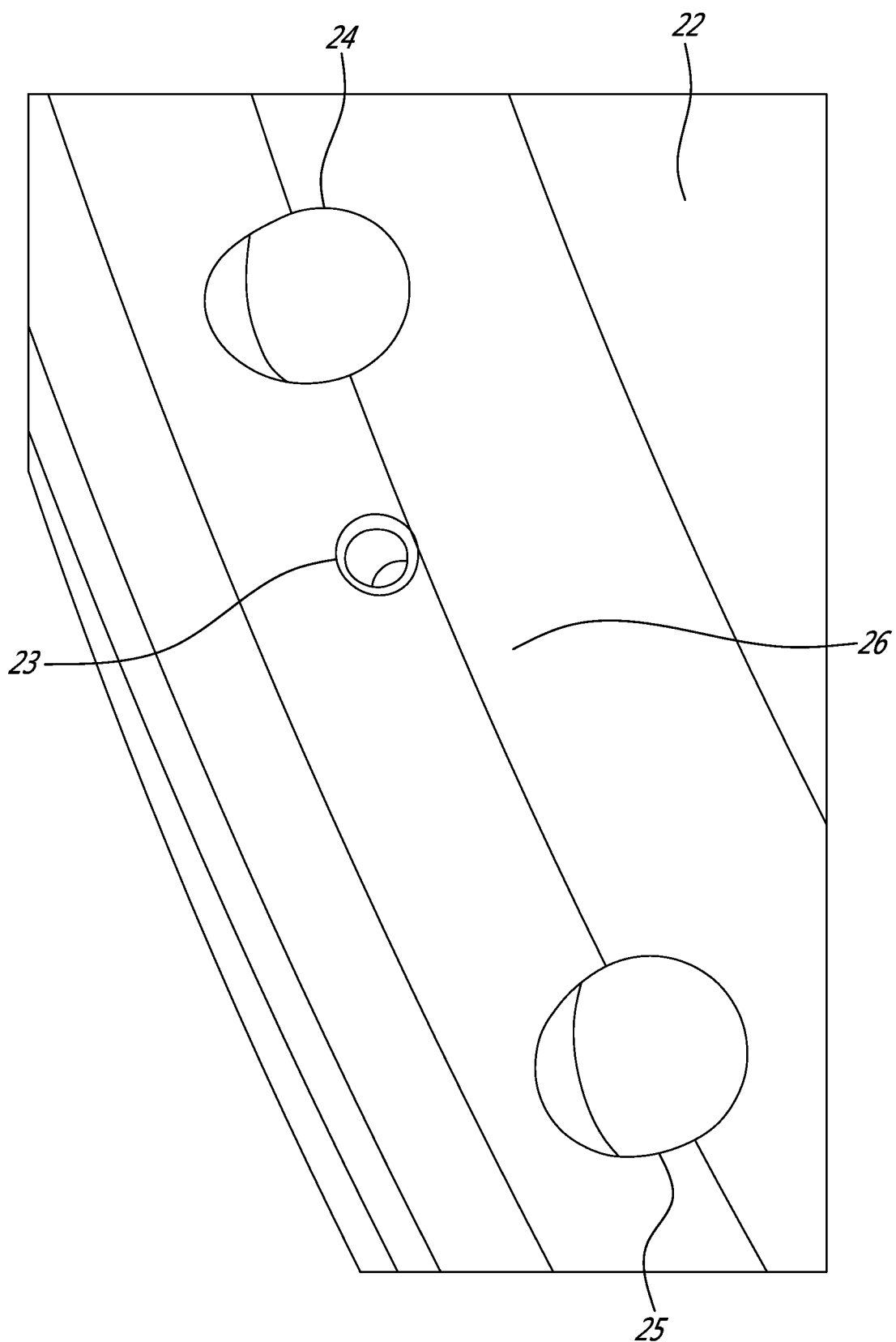

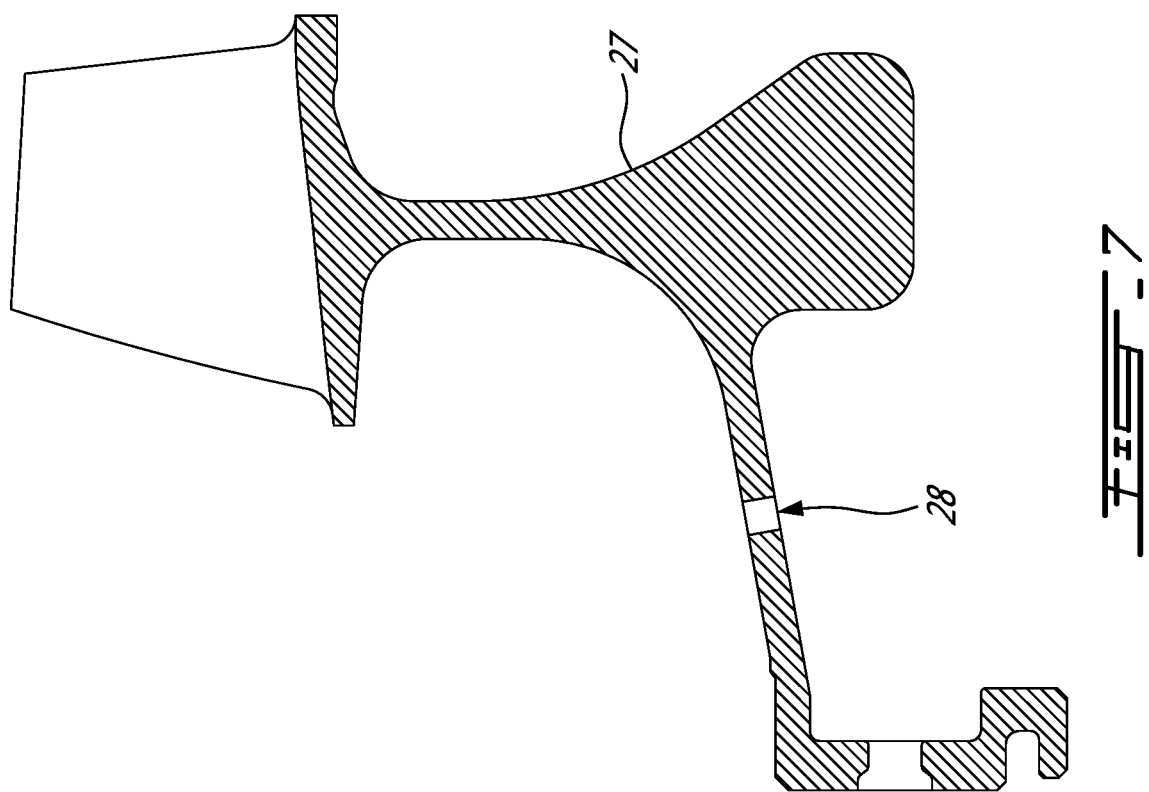

STRESS REDUCTION DIMPLES FOR CIRCULAR HOLES

TECHNICAL FIELD

The application relates to loaded members subjected to stress and, more particularly, to stress concentration created by holes in material subjected to stress in a predominant direction.

BACKGROUND OF THE ART

Holes in parts are known as stress raisers. Stress concentration adjacent the holes may impact the low cycle fatigue (LCF) life of the part.

There is thus a need to reduce the stress level in the holes of parts, which, in use, are subject to loads.

SUMMARY

In accordance with a general aspect, there is provided a method of reducing stress concentration in a material subjected to a predominant stress in a direction parallel to an axial plane defined through an axis of a circular hole in the material between a first material surface and a second material surface, the material having a material thickness defined between the first material surface and the second material surface, the method comprising: forming a first proximal recess in the first material surface on the axial plane having a depth less than the material thickness, the first proximal recess having an outer edge spaced a first proximal dimension in the axial plane from a first rim of the hole; and forming a second proximal recess in the second material surface on the axial plane having a depth less than the material thickness, the second proximal recess having an outer edge spaced a second proximal dimension in the axial plane from a second rim of the hole, wherein the first proximal dimension on the first material surface is diametrically opposite, relative to the hole, to the second proximal dimension on the second material surface.

In accordance with another aspect, there is provided a method of reducing stress concentration in an aircraft component subjected to a predominant stress in a direction normal to an axis of a hole defined through the aircraft component between opposed first and second surfaces thereof, the aircraft component having a material thickness defined between the opposed first and second surfaces, the method comprising: forming a first dimple in the first surface proximal to the hole, the first dimple being spaced a first distance from the hole on the first surface; and forming a second dimple in the second surface proximal to the hole, the second dimple being spaced a second distance from the hole on the second surface, wherein the first and second dimples on the first and second surfaces are disposed on opposite sides of the hole.

In accordance with a further aspect, there is provided an aircraft component comprising: a body having a thickness defined between first and second opposed surfaces, at least one hole extending thicknesswise through the body, in use, the body being subjected to a predominant stress in a direction normal to an axis of the at least one hole, a first dimple in the first surface proximal to the at least one hole, the first dimple being spaced a first distance from the at least one hole on the first surface; and a second dimple in the second surface proximal to the at least one hole, the second dimple being spaced a second distance from the at least one hole on the second surface, wherein the first and second dimples on the first and second surfaces are disposed on opposite sides of the at least one hole.

DESCRIPTION OF THE DRAWINGS

FIG. 1 is an isometric view of a sheet material having a through hole between a first (visible) surface and a second (hidden) surface, each surface having concave recesses aligned in the direction of predominant tensile stress.

FIG. 2 is a sectional view along line 2-2 of FIG. 1, showing proximal and distal recesses formed in both surfaces of the material spaced away from the rim of the hole in the direction of predominant stress.

FIG. 3 is a sectional view like FIG. 2 but showing the alternative of having only proximal recesses.

FIG. 4 is a sectional view showing the alternative of having a curved material with proximal recesses only.

FIG. 5 is a partial isometric view of a segment in a component having a hole and recesses shown in a concave surface.

FIG. 6 is a detail of the holes and recesses shown in FIG. 5.

FIG. 7 is a sectional view through an example of a gas turbine hub showing a through hole for oil leakage management in an internal hub surface.

DETAILED DESCRIPTION OF PREFERRED EMBODIMENTS

Figure 8:
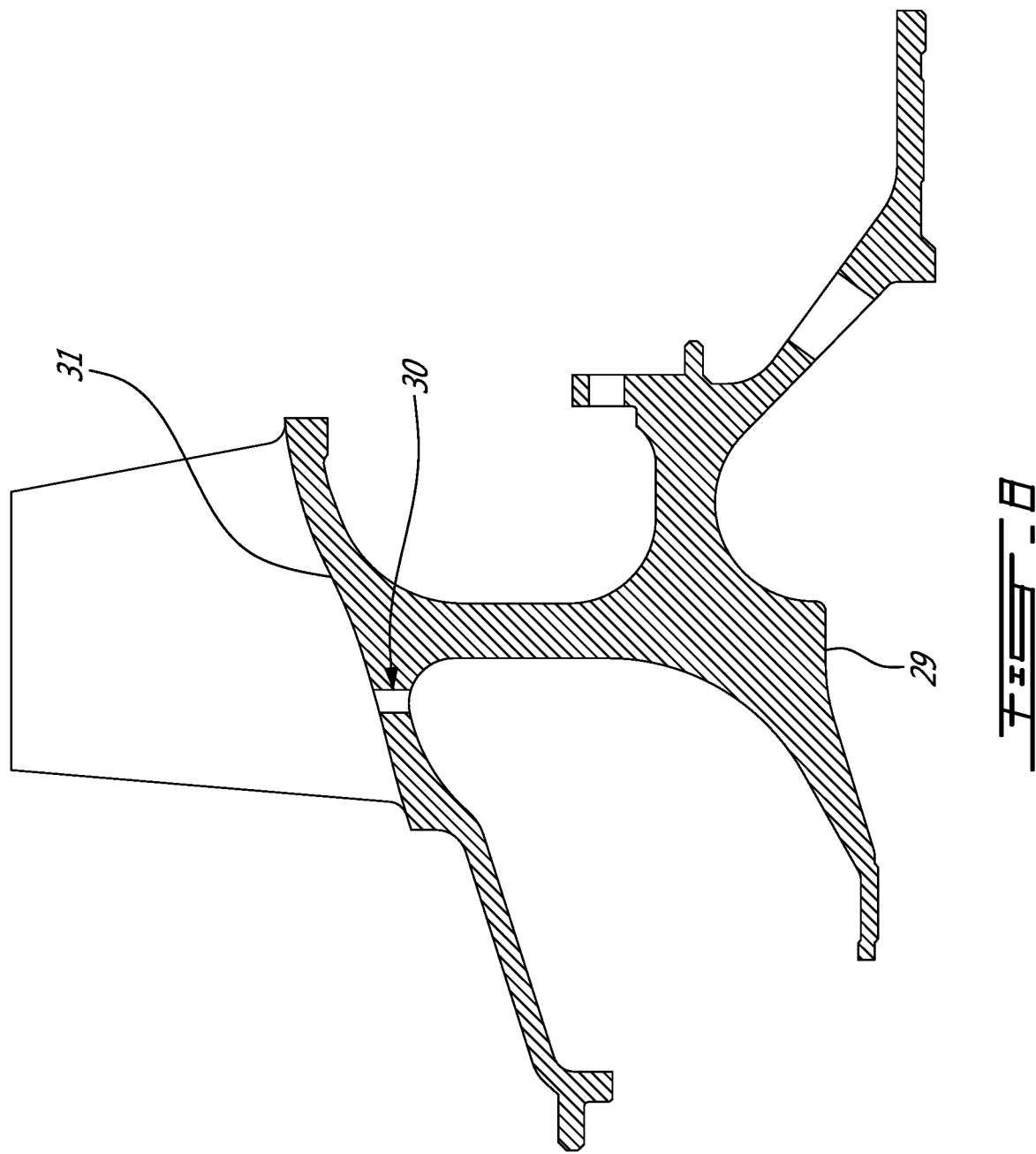
FIG. 8 is a sectional view through an example gas turbine hub showing a through hole for oil leakage management in an external blade platform surface.

As will be seen hereinafter, stress concentration created by holes in material subjected to stress in a predominant direction can be reduced by removing material from opposite sides of the material creating dimples or rounded recesses spaced from the hole along the axis of predominant stress.

Mathematical analysis and experimental measurement show that in a loaded structural member subjected to stress, adjacent to discontinuities or changes in the cross-section, a non-uniform distribution of stress occurs in which the peak stress (σmax) reaches much larger magnitudes than does the average stress (σavg) over the cross-section. The normally presumed uniform average stress (σavg) simply equals the applied force divided by the total cross-sectional area.

In this description stress in a predominant direction is assumed for simplicity. The principle of superposition is used to separately analyze stresses in multiple directions which are then summed together to determine a maximum stress, using Mohr's circle technique for example.

The stress concentration or peak stress (σmax) is found at the surface of the holes, grooves, notches, sharp corners, cracks, and other discontinuities in shape, surface, contours or cross-section changes. The section variation that causing the stress concentration is referred to as a stress raiser.

A common example of a stress raiser or stress concentration is a drilled hole in a large plate of material having uniform thickness subjected to tension or uni-axial tensile stress (i.e. compressive buckling and torsion effects are absent). For an applied uniaxial tension the stress field is found from linear elasticity theory. For a hole in an infinitely large plate, the peak stress (σmax) is three times the uniform average stress (σavg) and is found at the edges of the hole on a diametric plane that is perpendicular to the axis of stress (i.e. transverse plane of lowest cross-sectional area).

General equations for calculating stress concentration effects, formulas, tables and suggestions for reducing stress-concentration through design changes can be found in technical textbooks and literature, for example Roark's Formulas for Stress and Strain, 8th Edition, Dec. 19 2011, by Warren Young, Richard Budynas, and Ali Sadegh, McGraw-Hill Education, ISBN-10: 0071742476, the entire contents of which is herein incorporated by reference.

As a general rule, to reduce stress concentration, force should be transmitted from point to point as smoothly as possible. The lines connecting the force transmission path can be visualized as a flow of force, or stress flow.

Finite element analysis (FEA) is commonly used to determine stresses within solid objects subjected to forces. Precise iterative design calculations can be conducted that inform the designer of the areas of high stress concentration. Through trial and error FEA can reveal the effects of minor changes in shape, contours and cross-section on internal stresses. Sharp transitions in the direction of the force flow are generally reduced if possible by smoothing contours and rounding notch roots for example. When stress raisers are necessitated by functional requirements, the raisers such as notches or holes are placed in regions of low nominal stress if possible.

However the intuitive analogy of visualizing force flow around discontinuities and through the solid material, analogous to the flow of water, remains useful for designers, even when accurate computer generated FEA techniques are employed, at least during the initial design iterations.

Continuing the analogy of stress flow, the provision of recesses on both sides of a hole and on opposite surfaces of a material serves to direct the stress flow away from the hole edges and into the solid material away from the hole. According to one aspect, the recesses or dimples are aligned with the hole in the direction of predominant stress to shield the hole from the flow of stress.

A thinner zone of material is created beneath each recess that is more ductile than the adjacent thicker zones and thereby generates a higher level of strain beneath each recess. The higher level of strain beneath each recess results in a lower level of strain in thicker material adjacent to the hole, since total strain is constrained to be equal to total strain remote from the recesses. The increase in strain beneath the recesses is thereby balanced by a reduced strain in the material immediately adjacent to the hole.

The material around the hole is by analogy partially shielded from the flow of stress by the intervention of the recesses that redirect the stress flow away from the hole. There is a stress increase in the material beneath the recesses, compared to stress in material with no recess, and the increase in stress beneath the recess is balanced by a decrease in stress adjacent the hole.

The size, depth and spacing of the recesses is regulated, through FEA iterations for example, such that there are similar levels of stress adjacent the hole (reduced) and beneath the recesses (increased), so that similar levels of stress produce similar low cycle fatigue lives. The recesses reduce the maximum stress due to the stress concentration caused by the hole and raise the stress beneath the recesses, to balance the distribution of stress more equally and equalize the low cycle fatigue life throughout the material.

Absent the recesses, maximum stress is found in the material at the lateral edges of the hole which is three times the nominal average stress for a round hole. According to one aspect, the provision of recesses as described herein may reduce maximum stress concentration by a level in the order of 35%.

Referring now more particularly to FIGS. 1 and 2, a method is provided for reducing the stress concentration in an aircraft component, for instance, a sheet material 1 subjected to a predominant tensile stress in a left-right direction as indicated with multiple arrows. The predominant stress is parallel to an axial plane defined along section line 2-2 passing through the central axis 2 of a circular hole 3. According to the non-limiting example, the hole is cylindrical. However, it is understood that the hole could have other configurations. For instance, it could be frustoconical, slanted and/or have an elliptical cross-section. The material has a first material surface 4 and a second material surface 5, and a thickness 6. The hole 3 passes through both surfaces 4, 5 has a first rim 7 and a second rim 8 respectively at the intersection.

To reduce the stress concentration created by the hole 3, a first proximal recess 9 is formed in the first material surface 4 on the axial plane defined along section line 2-2. The recess 9 may be provided in the form of a dimple having a curved bottom. As seen in FIG. 2, the depth of the first proximal recess 9 is less than the material thickness 6 to maintain a stress flow capacity beneath the recess 9 and to maintain the continuity of the second surface 5, which may be used for containing a fluid for example. The first proximal recess 9 has an outer edge 10 spaced a first proximal dimension 11 in the axial plane from the first rim 7 of the hole 3.

The first proximal dimension 11 is non-zero since intersecting the first rim 7 of the hole 3 and the outer edge 10 of the first proximal recess 9 would create an acute peak which would cause stress concentration itself. However, the first proximal recess 9 should also be immediately adjacent the first rim 7 to best shield the hole 3 from the stress flow. FEA and practical spacing considerations for manufacture can provide a realistic range for the first proximal dimension 11.

A second proximal recess 12 is shown equal and opposite to the first proximal recess 9. It is understood that the second recess may also be provided in the form of a dimple. The second proximal recess 12 is formed in the second material surface 5 on the same axial plane and also having a depth less than the material thickness 6. The second proximal recess 12 also has an outer edge 13 spaced a second non-zero proximal dimension 14 in the same axial plane from the second rim 8 of the hole 3. The first proximal dimension 11 on the first material surface 4 is diametrically opposite, relative to the hole 3, to the second proximal dimension 14 on the opposite second material surface 5. The example illustrated shows the first proximal dimension 11 equal to the second proximal dimension 14, however different dimensions 11, 14 may be used depending on the practicalities of machine tool access and the stresses involved.

FIG. 3 shows a possible alternative having only two recesses namely the first proximal recess 9 and second proximal recess 12 that may be preferred if available space or access is limited for machine tools or due to other required surface features.

In the example shown in FIG. 2, the method includes further forming a first distal recess 15 in the first material surface 4 on the same axial plane having a depth less than the material thickness 6. The first distal recess 15 has an outer edge 16 spaced a first distal dimension 17 in the axial plane from the first rim 7 of the hole 3. The first distal dimension 17 on the first material surface 4 is diametrically opposite, relative to the hole 3, and greater than the first proximal dimension 11 also on the first material surface 11.

A second distal recess 18 is formed in the second material surface 5 on the axial plane having a depth less than the material thickness 6. The second distal recess 18 has an outer edge 19 spaced a second distal dimension 20 in the axial plane from the second rim 8 of the hole 3. The second distal dimension 20 on the second material surface 5 is diametrically opposite to and greater than the second proximal dimension 14 on the second material surface 5.

Preferably the first proximal recess 9, the second proximal recess 12, the first proximal recess 15 and the second proximal recess 18 are formed by removing material from the first and second material surfaces 4, 5. Machining with rotary milling tools, grinding and polishing for example will create a smooth concave interior surface and smooth transition to the outer edges 10, 13, 16, 19 thereby avoiding the creation of sharp edges or discontinuities that would create further stress raisers. Cold forming the recesses 9, 12, 15, 18 is possible but will create undesirable residual compressive stresses and work hardening in the material adjacent to the recesses 9, 12, 15, 18.

As illustrated, the first and second proximal recesses 9, 12, and the first and second distal recesses 15, 18 each have a concave interior surface such as a spheroidal shape; or a spherical shape that can be efficiently machined with common rotating tools. The depth of the recesses 9, 12, 15, 18 shown in the drawings is less than a minor radius of the spheroidal shaped rotary tool or less than a radius of the spherical shaped rotary tool such that a wide shallow recess of adequate depth can be accessed with rotary tools having a central shaft.

FIGS. 1-3 show an example of a planar first material surface 4 and a planar second material surface 5. FIG. 4 shows an alternative material where the first and second material surfaces 4, 5 are curved in one direction or curved in two orthogonal directions, such as a dome or saddle compound curvature. The example of FIG. 4 also shows holes 3 relatively close together such that only first and second proximal recesses 9, 12 are accommodated in the available space.

Where space is available, formation of additional distal recesses (not shown in FIG. 4) is preferable to better shield the holes 3 from stress flow and stress concentration effects. Adding further remote recesses, i.e. 6 or 8 recesses around each hole 3, is possible however there are diminishing effective stress reductions when more than four recesses per hole 3 are employed.

Preferably the depth of the first and second distal recesses 15, 18 is greater than the depth of the first and second proximal recesses 9, 12, also since the hole 3 is thereby better shielded from stress flow.

Through FEA analysis, it has been found that the depth of the first and second distal recesses 15, 18 should be relatively deeper than the proximal recesses 9, 12, but no greater than 60% and preferably no greater than 45% of the material depth 6. Greater depths tend to increase the stress level in the material beneath the distal recesses 15, 18 to levels where the fatigue life decrease beneath the distal recesses 15, 18 outweighs the fatigue life increase adjacent to the hole 3.

The size of the distal recesses 15, 18 should also be relatively greater than the size of the proximal recesses 9, 12 to better shield the hole 3 from stress concentration or stress flow effects. Where the recesses are spheroidal a minor radius of the first and second distal recesses 15, 18 is greater than a minor radius of the first and second proximal recesses 9, 12 to generate the desired size differences. Using a rotary tool with a spheroidal or spherical path, the depth of the recess formed is generated by the operating radius of the tool. Therefore the minor radius of the first and second distal recesses 15, 18 should be no greater than 60% of the material thickness 6 to achieve the limited recess depth noted above. The depth of the first and second proximal recesses 9, 12 should be limited to no greater than 45% of the material thickness 6 to better shield the hole 3.

Referring to FIG. 2, to avoid recess intersections and avoid generating a thin layer of material between recesses on opposite surfaces of the material, the recesses on opposite sides of the material should be spaced apart a minimum distance. Preferably the first proximal recess 9 and the second distal recess 18 each have a concave surface spaced apart a minimum diagonal distance 21 in the axial plane along line 2-2. Preferably the minimum distance 21 is no less than 50% to 100% of the material thickness 6. On the opposite side of the hole 3 the second proximal recess 12 and the first distal recess 15 each have a concave surface spaced apart the same minimum distance 21 in the axial plane, being no less than 50% to 100% of the material thickness 6.

FIGS. 5-8 show examples of highly stressed gas turbine engine components subjected to high centrifugal forces, and thermal forces that are required to have stress concentrating holes for various reasons. Use of recesses on the surfaces adjacent to the holes aligned in the direction of predominant stress can be employed to reduce stress concentration effects.

FIG. 5 is a partial isometric view of a segment in a nosecone 22 for a gas turbine engine having a drain hole 23 for moisture or oil leakage to escape. The direction of predominant stress through the hole 23 is circumferential in this example. As better seen in the detail of FIG. 6, a proximal recess 24 and a distal recess 25 are shown in a first concave surface 26. It will be understood that as in FIGS. 2-4 on the hidden opposite side further proximal and distal recesses (not shown) would be formed as well opposite to those recesses 24, 25 shown.

FIG. 7 is a sectional view through an example compressor hub 27 which is highly stressed showing a through hole 28 for draining oil leakage. Use of recesses to reduce stress concentration caused by such a hole may be useful in extending the low cycle fatigue life of the hub 27. FIG. 8 is a sectional view through an example gas turbine hub 29 showing a through hole 30 for oil leakage management in an external blade platform surface 31. Recesses may be provided in one or more sides of the surface 31 to reduce stress concentration due to the hole 30 location.

Although the above description relates to a specific preferred embodiment as presently contemplated by the inventor, it will be understood that the invention in its broad aspect includes mechanical and functional equivalents of the elements described herein.

I claim:

1. A method of reducing stress concentration in a material subjected to a predominant stress in a direction parallel to an axial plane defined through an axis of a circular hole in the material between a first material surface and a second material surface, the material having a material thickness defined between the first material surface and the second material surface, the method comprising:

forming a first proximal recess in the first material surface on the axial plane having a depth less than the material thickness, the first proximal recess having an outer edge spaced a first proximal dimension in the axial plane from a first rim of the hole;

forming a second proximal recess in the second material surface on the axial plane having a depth less than the material thickness, the second proximal recess having an outer edge spaced a second proximal dimension in the axial plane from a second rim of the hole, wherein the first proximal dimension on the first material surface is diametrically opposite, relative to the hole, to the second proximal dimension on the second material surface; and forming a first distal recess in the first material surface on the axial plane having a depth less than the material thickness, the first distal recess having an outer edge spaced a first distal dimension in the axial plane from the first rim of the hole, wherein the first distal dimension on the first material surface is diametrically opposite, relative to the hole, and greater than the first proximal dimension on the first material surface; and forming a second distal recess in the second material surface on the axial plane having a depth less than the material thickness, the second distal recess having an outer edge spaced a second distal dimension in the axial plane from the second rim of the hole, wherein the second distal dimension on the second material surface is diametrically opposite to and greater than the second proximal dimension on the second material surface;

wherein the depths of the first and second distal recesses are greater than the depths of the first and second proximal recesses.

2. The method according to claim 1 wherein the first proximal recess and the second distal recess each have a concave surface spaced apart a minimum distance in the axial plane, wherein the minimum distance is no less than 50% of the material thickness.

3. The method according to claim 2 wherein the second proximal recess and the first distal recess each have a concave surface spaced apart a minimum distance in the axial plane, wherein the minimum distance is no less than 50% of the material thickness.

4. The method according to claim 3 wherein the minimum distance is no less than the material thickness.

5. The method according to claim 2 wherein the minimum distance is no less than the material thickness.

6. The method according to claim 1 wherein at least one of: the first and second proximal recesses, and the first and second distal recesses have a concave surface being one of: a spheroidal shape; and a spherical shape.

7. The method according to claim 6 wherein the depth of at least one of: the first and second proximal recesses, and the first and second distal recesses is one of: less than a minor radius of the spheroidal shape; and less than a radius of the spherical shape.

8. The method according to claim 1 wherein the depths of the first and second distal recesses are no greater than 60% of the material thickness.

9. The method according to claim 8 wherein the depths of the first and second proximal recesses are no greater than 45% of the material thickness.

10. The method according to claim 1 wherein the minor radiuses of the first and second distal recesses are no greater than 60% of the material depth.

11. The method according to claim 10 wherein the depths of the first and second proximal recesses are no greater than 45% of the material thickness.

12. The method according to claim 1 wherein at least one of: the first and second proximal recesses, and the first and second distal recesses are formed by removing material from the first and second material surfaces.

13. The method according to claim 1 wherein one of: the first material surface; and the second material surface, is one of: planar; curved in one direction; curved in two orthogonal directions.

14. The method according to claim 1 wherein a minor radius of the first and second distal recesses is greater than a minor radius of the first and second proximal recesses.

15. A method of reducing stress concentration in a material subjected to a predominant stress in a direction parallel to an axial plane defined through an axis of a circular hole in the material between a first material surface and a second material surface, the material having a material thickness defined between the first material surface and the second material surface, the method comprising:

forming a first proximal recess in the first material surface on the axial plane having a depth less than the material thickness, the first proximal recess having an outer edge spaced a first proximal dimension in the axial plane from a first rim of the hole;

forming a second proximal recess in the second material surface on the axial plane having a depth less than the material thickness, the second proximal recess having an outer edge spaced a second proximal dimension in the axial plane from a second rim of the hole, wherein the first proximal dimension on the first material surface is diametrically opposite, relative to the hole, to the second proximal dimension on the second material surface; and forming a first distal recess in the first material surface on the axial plane having a depth less than the material thickness, the first distal recess having an outer edge spaced a first distal dimension in the axial plane from the first rim of the hole, wherein the first distal dimension on the first material surface is diametrically opposite, relative to the hole, and greater than the first proximal dimension on the first material surface; and forming a second distal recess in the second material surface on the axial plane having a depth less than the material thickness, the second distal recess having an outer edge spaced a second distal dimension in the axial plane from the second rim of the hole, wherein the second distal dimension on the second material surface is diametrically opposite to and greater than the second proximal dimension on the second material surface;

wherein a minor radius of the first and second distal recesses is greater than a minor radius of the first and second proximal recesses.

* * * * *